(12) United States Patent
Kronick et al.

(10) Patent No.: US 7,642,097 B2
(45) Date of Patent: Jan. 5, 2010

(54) MANUFACTURE AND USE OF NON-STANDARD SIZE MICROARRAY SLIDES

(75) Inventors: Mel N. Kronick, Palo Alto, CA (US); Barnett E. Saunders, Portland, OR (US); Matthew J. Marton, Seattle, WA (US); John S. Hinchcliffe, Seattle, WA (US); Dianne Rees, Sunnyvale, CA (US); Carol T. Schembri, San Mateo, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 0 days.

(21) Appl. No.: 12/163,751

(22) Filed: Jun. 27, 2008

(65) Prior Publication Data
US 2008/0261826 A1 Oct. 23, 2008

Related U.S. Application Data

(60) Continuation of application No. 11/287,808, filed on Nov. 28, 2005, now abandoned, which is a continuation-in-part of application No. 11/030,391, filed on Jan. 5, 2005, now abandoned, which is a division of application No. 09/671,966, filed on Sep. 27, 2000, now Pat. No. 6,864,097.

(51) Int. Cl.
*B01L 9/00* (2006.01)
(52) U.S. Cl. .................. 436/164; 206/456; 422/99; 422/100; 422/102; 422/104; 435/288.3; 436/174; 436/180

(58) Field of Classification Search ................. 206/456; 356/39; 359/391; 422/64, 99, 102, 104, 422/100; 435/288.3; 436/46, 164, 174, 180; 506/9, 13, 30, 33, 393
See application file for complete search history.

(56) References Cited

U.S. PATENT DOCUMENTS

| 4,635,791 | A | * | 1/1987 | Jackson et al. | 206/210 |
|---|---|---|---|---|---|
| 5,595,707 | A | | 1/1997 | Copeland et al. | |
| 6,251,601 | B1 | | 6/2001 | Bao et al. | |
| 6,264,891 | B1 | | 7/2001 | Heyneker et al. | |
| 6,309,607 | B1 | * | 10/2001 | Johnston et al. | 422/104 |
| 6,461,734 | B1 | * | 10/2002 | Carre | 428/429 |
| 6,864,097 | B1 | | 3/2005 | Schembri et al. | |
| 2004/0223890 | A1 | * | 11/2004 | Summers et al. | 422/104 |
| 2005/0271552 | A1 | * | 12/2005 | Coassin et al. | 422/100 |

* cited by examiner

*Primary Examiner*—Joseph W Drodge

(57) ABSTRACT

Methods and devices are disclosed for microarray analysis. In one embodiment a method is disclosed for processing a non-standard size slide having an array of chemical compounds attached to a surface of the slide. A sample is exposed to the surface of the non-standard size slide wherein components in the sample bind to the chemical compounds on the surface of the slide. The sample and the slide are incubated under conditions for carrying out the binding reactions, and the surface of the non-standard size slide is examined for the results of the binding reactions. Prior to the exposing step or the incubating step or the examining step, the non-standard size slide is placed into a slide holder comprising a slide-holding section a slide-holding section adapted to dispose the non-standard size slide to a processing instrument in a manner similar to that for a standard size slide. The non-standard size slide may also include an identifier such as a bar code.

14 Claims, 1 Drawing Sheet

MANUFACTURE AND USE OF NON-STANDARD SIZE MICROARRAY SLIDES

CROSS-REFERENCE TO RELATED APPLICATIONS

This application is a continuation of U.S. patent application Ser. No. 11/287,808 filed Nov. 28, 2005 (abandoned), which is a continuation-in-part of U.S. patent application Ser. No. 11/030,391 filed Jan. 5, 2005, now abandoned which is a divisional of U.S. patent application Ser. No. 09/671,966 filed Sep. 27, 2000 (now U.S. Pat. No. 6,864,097), the disclosures of which are incorporated herein by reference in their entirety.

BACKGROUND OF THE INVENTION

This invention relates to the manufacture of supports or substrates having bound to the surfaces thereof a plurality of chemical compounds, such as biopolymers. In particular, the invention relates to the manufacture of microarray slides of non-standard size and, more particularly, to the manufacture of microarray slides having a size that is smaller in at least one dimension than a standard microscopic slide.

In the field of diagnostics and therapeutics, it is often useful to attach species to a surface. One important application is in solid phase chemical synthesis wherein initial derivatization of a substrate surface enables synthesis of polymers such as oligonucleotides and peptides on the substrate itself. Support bound oligomer arrays, particularly oligonucleotide arrays, may be used in screening studies for determination of binding affinity.

Determining the nucleotide sequences and expression levels of nucleic acids (DNA and RNA) is critical to understanding the function and control of genes and their relationship, for example, to disease discovery and disease management. Analysis of genetic information plays a crucial role in biological experimentation. This has become especially true with regard to studies directed at understanding the fundamental genetic and environmental factors associated with disease and the effects of potential therapeutic agents on the cell. Such a determination permits the early detection of infectious organisms such as bacteria, viruses, etc.; genetic diseases such as sickle cell anemia; and various cancers. This paradigm shift has lead to an increasing need within the life science industries for more sensitive, more accurate and higher-throughput technologies for performing analysis on genetic material obtained from a variety of biological sources.

Unique or misexpressed nucleotide sequences in a polynucleotide can be detected by hybridization with a nucleotide multimer, or oligonucleotide, probe. Hybridization is based on complementary base pairing. When complementary single stranded nucleic acids are incubated together, the complementary base sequences bind to one another or pair to form double stranded hybrid molecules. These techniques rely upon the inherent ability of nucleic acids to form duplexes via hydrogen bonding according to Watson-Crick base-pairing rules. The ability of single stranded deoxyribonucleic acid (ssDNA) or ribonucleic acid (RNA) to form a hydrogen bonded structure with a complementary nucleic acid sequence has been employed as an analytical tool in molecular biology research. An oligonucleotide probe employed in the detection is selected with a nucleotide sequence complementary, usually exactly complementary, to the nucleotide sequence in the target nucleic acid. Following hybridization of the probe with the target nucleic acid, any oligonucleotide probe/nucleic acid hybrids that have formed are typically separated from unhybridized probe. The amount of oligonucleotide probe in either of the two separated media is then tested to provide a qualitative or quantitative measurement of the amount of target nucleic acid originally present.

Direct detection of labeled target nucleic acid hybridized to surface-bound polynucleotide probes is particularly advantageous if the surface contains a mosaic of different probes that are individually localized to discrete, and often known, areas of the surface. Such ordered arrays containing a large number of oligonucleotide probes have been developed as tools for high throughput analyses of genotype and gene expression. Oligonucleotides synthesized on a solid support recognize uniquely complementary nucleic acids by hybridization, and arrays can be designed to define specific target sequences, analyze gene expression patterns or identify specific allelic variations. The arrays may be used for conducting cell study, diagnosing disease, identifying gene expression, monitoring drug response, determination of viral load, identifying genetic polymorphisms, analyzing gene expression patterns or identifying specific allelic variations, and the like.

In one approach, cell matter is lysed, to release its DNA as fragments, which are then separated out by electrophoresis or other means, and then tagged with a fluorescent or other label. The resulting DNA mix is exposed to an array of oligonucleotide probes, whereupon selective binding to matching probe sites takes place. The array is then washed and interrogated to determine the extent of hybridization reactions. In one approach the array is imaged so as to reveal for analysis and interpretation the sites where binding has occurred. Arrays of different chemical compounds or moieties or probe species provide methods of highly parallel detection, and hence improved speed and efficiency, in assays. Assuming that the different sequence polynucleotides were correctly deposited in accordance with the predetermined configuration, then the observed binding is indicative of the presence and/or concentration of one or more polynucleotide components of the sample.

The arrays may be microarrays created on the surface of a support by in situ synthesis of biopolymers such as polynucleotides, polypeptides, polysaccharides, etc., and combinations thereof, or by deposition of molecules such as oligonucleotides, cDNA and so forth. In general, arrays are synthesized on a surface of a support or substrate by one of any number of synthetic techniques that are known in the art. In one approach, for example, the support may be one on which a single array of chemical compounds is synthesized. Alternatively, multiple arrays of chemical compounds may be synthesized on the support, which is then diced, i.e., cut, into individual assay devices, which are supports that each comprises a single array, or in some instances multiple arrays, on a surface of the support.

The dimensions of a standard microscope slide are generally about one inch (about 25 mm) in width, about three inches (about 75 mm) in length and about 0.040 inches (about 1 to 1.2 mm) in thickness. Many apparatus for automating various procedures that are employed in manipulations involving microarrays on slides are designed for the standard microscope slide. Such manipulations include contacting the surface of the slide with various reagents and washing buffers, providing for specific chemical conditions during which specific binding (e.g., hybridization) can occur or during which species-selective washing can occur, examining the surface for the results of contacting the surface with a sample, and so forth. Furthermore, many of the above known apparatus are designed assuming one array of chemical compounds per slide. A standard microscope slide can carry up to about 20,000 or more features comprising chemical compounds. In many circumstances much fewer features are required for analyzing samples for various analytes or components that might be present in the samples. For example, many determinations require only about 1500 to about 2500 features. This has given rise to having multiple arrays on the surface of a standard microscope slide. However, since many of the known apparatus are designed assuming one array per slide, standard microscope slides that have more than one array for conservation of samples and reagents, minimization of sample handling steps, and the like, usually include barriers for separating the arrays from one another during the processing and examining stages. The barriers may be physical such as, for example, ridges, gaskets, and the like, or chemical such as, for example, coatings that are hydrophobic, and the like. All of the above contribute to higher costs of manufacture and use.

There is, therefore, a need for methods of preparing slides with a single array of features where the slides are generally smaller than the standard microscope slide. There is also a need for methods and devices for using non-standard size slides with known equipment that is designed for handling a standard microscope slide in an automated manner. There is also a need for having one identifier associated with one array on a slide.

SUMMARY OF THE INVENTION

One embodiment of present invention is a method for processing a non-standard size slide having an array of chemical compounds attached to a surface of the slide. A sample is exposed to the surface of the non-standard size slide wherein components in the sample bind to the chemical compounds on the surface of the slide. The sample and the slide are incubated under conditions for carrying out the binding reactions, and the surface of the non-standard size slide is examined for the results of the binding reactions. Prior to the exposing step or the incubating step or the examining step, the non-standard size slide is placed into a slide holder comprising a slide-holding section adapted to dispose the non-standard size slide to a processing instrument in a manner similar to that for a standard size slide.

Another embodiment of the invention is a method for preparing and processing a plurality of non-standard size slides wherein each slide has an array of chemical compounds attached to a surface of the slide. A plurality of arrays is formed on a surface of a sheet of slide material, which is divided into a plurality of non-standard size slides. Each of the slides has a single array of chemical compounds on a surface thereof and each slide has at least one dimension that is less than that of a standard microscope slide. A sample is exposed to the surface of the non-standard size slide and the chemical compounds on the surface bind to components in the sample, which is incubated with the surface under conditions for carrying out the binding reactions. The non-standard size slide is placed into a slide holder comprising a slide-holding section adapted to dispose the non-standard size slide to a processing instrument in a manner similar to that for a standard size slide. The surface of the slide is examined for the results of the binding reactions.

Another embodiment of the invention is a device comprising a non-standard size slide having at least one dimension that is less than that of a standard microscope slide and a holder for the non-standard size slide wherein the holder comprises a slide-holding section adapted to dispose the non-standard size slide to a processing instrument in a manner similar to that for a standard size slide. The non-standard size slide has a single array of chemical compounds on a surface of the slide.

Another embodiment of the present invention is a device comprising a non-standard size slide having at least one dimension that is less than that of a standard microscope slide and an identifier on the non-standard size slide. The non-standard size slide has a single array of chemical compounds on a surface of the slide.

DETAILED DESCRIPTION OF THE INVENTION

Figure 1:
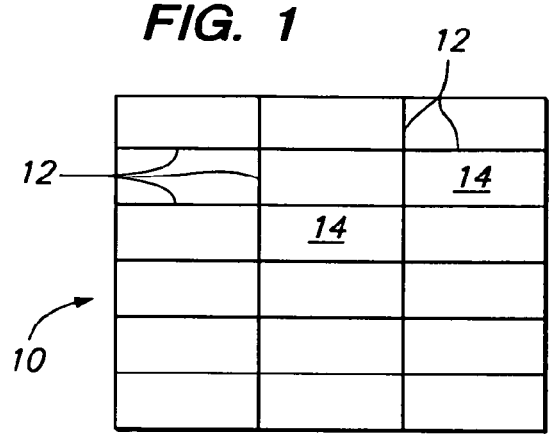
FIG. 1 is a depiction of a sheet of slide material, which comprises lines to delineate individual non-standard size slides.

In one aspect, the present invention provides methods for preparing substrates having an array of features bound to at least one surface of the substrate. The features generally comprise chemical compounds. The present methods provide array slides that have a non-standard size as compared to the standard microscope slide. The chemical compounds are arranged to form an array on each of a plurality of predetermined sections of a larger sheet of substrate that is divided to provide single slides, each comprising a single array of chemical compounds. In some embodiments the single slides each have an identifier, which is specific for the one array on its surface. In some embodiments the non-standard size slide is used in conjunction with a holder, which has a slide holding section adapted to dispose the non-standard size slide to a processing instrument in a manner similar to that for a standard size slide. This permits the present slides to be processed by known equipment designed for processing of slides having dimensions of a standard microscope slide.

Preferred materials for the sheet of material are those that provide physical support for the chemical compounds that are deposited on the surface or synthesized on the surface in situ from subunits. The materials should be of such a composition that they endure the conditions of a deposition process and/or an in situ synthesis and of any subsequent treatment or handling or processing that may be encountered in the use of the particular array.

Typically, the support material is transparent. By "transparent" is meant that the support material permits signal from features on the surface of the support to pass therethrough without substantial attenuation and also permits any interrogating radiation to pass therethrough without substantial attenuation. By "without substantial attenuation" may include, for example, without a loss of more than 40% or more preferably without a loss of more than 30%, 20% or 10%, of signal. The interrogating radiation and signal may for example be visible, ultraviolet or infrared light. In certain embodiments, such as for example where production of binding pair arrays for use in research and related applications is desired, the materials from which the substrate may be fabricated should ideally exhibit a low level of non-specific binding during hybridization events. However, it should be noted that the nature of the transparency of the substrate is somewhat dependent on the nature of the scanner employed to read the substrate surface. Some scanners work with opaque or reflective substrates.

The materials may be naturally occurring or synthetic or modified naturally occurring. Suitable rigid substrates may include glass, which term is used to include silica, and include, for example, glass such as glass available as Bioglass, and suitable plastics. Should a front array location be used, additional rigid, non-transparent materials may be considered, such as silicon, mirrored surfaces, laminates, ceramics, opaque plastics, such as, for example, polymers such as, e.g., poly(vinyl chloride), polyacrylamide, polyacrylate, polyethylene, polypropylene, poly(4-methylbutene), polystyrene, polymethacrylate, poly(ethylene terephthalate), nylon, poly(vinyl butyrate), etc., either used by themselves or in conjunction with other materials. The surface of the support is usually the outer portion of a support.

The surface of the material onto which the chemical compounds are deposited or formed may be smooth or substantially planar, or have irregularities, such as depressions or elevations. The surface may be modified with one or more different layers of compounds that serve to modify the properties of the surface in a desirable manner. Such modification layers, when present, will generally range in thickness from a monomolecular thickness to about 1 mm, usually from a monomolecular thickness to about 0.1 mm and more usually from a monomolecular thickness to about 0.001 mm. Modification layers of interest include: inorganic and organic layers such as metals, metal oxides, polymers, small organic molecules and the like. Polymeric layers of interest include layers of: peptides, proteins, polynucleic acids or mimetics thereof (for example, peptide nucleic acids and the like); polysaccharides, phospholipids, polyurethanes, polyesters, polycarbonates, polyureas, polyamides, polyethylene amines, polyarylene sulfides, polysiloxanes, polyimides, polyacetates, and the like, where the polymers may be hetero- or homo-polymeric, and may or may not have separate functional moieties attached thereto (for example, conjugated). Various further modifications to the particular embodiments described above are, of course, possible. Accordingly, the present invention is not limited to the particular embodiments described in detail above.

The material used for an array support or substrate may take any of a variety of configurations ranging from simple to complex. Usually, the material is substantially rectangular and relatively planar such as, for example, a slide. In many embodiments, the material is shaped generally as a rectangular solid. As mentioned above, multiple arrays of chemical compounds are synthesized on a sheet, which is then singulated, such as, e.g., cut by breaking along score lines, into single array slides. The sheet of material may be of any convenient size depending on the nature of the equipment used, production lot size, productive efficiencies, production throughput demands, and so forth. In some embodiments, the sheet of material is usually about 5, about 6, about 7, about 8, about 9, about 10, about 11, about 12, about 13 inches in length and about 5, about 6, about 7, about 8, about 9, about 10, about 11, about 12, about 13 inches in width so that the sheet may be divided into multiple single array supports having the dimensions indicated below. The thickness of the sheet may be less than 1 cm, or even less than 5 mm, 2 mm, 1 mm, or in some embodiments even less than 0.5 mm or 0.2 mm. The thickness of the support is about 0.01 mm to 5.0 mm, usually from about 0.1 mm to 2 mm and more usually from about 0.2 to 1. In a specific embodiment by way of illustration and not limitation, a wafer that is 6.25 inches by 6 inches by 1 mm is employed.

The individual or single support is the section of the sheet that is produced by dividing the sheet, usually along predetermined lines as discussed above. The individual support usually has a single array of chemical compounds that have been synthesized or deposited on a surface when the individual support was part of the sheet. The dimensions of the individual support are determined by the number of features in the array on the surface of the support, the intended use of the support, e.g., in conducting assays involving the chemical compounds on the surface of the support, ease of manual and automated handling steps, and so forth.

In general, at least one dimension, for example, length, of the individual support of the invention is smaller than the corresponding dimension of a standard microscope slide. A standard size microscope slide is usually about 3 inches in length and 1 inch in width. Accordingly, as used herein, the phrase "non-standard size slide" refers to a slide having at least one dimension such as length or width that is smaller than a corresponding dimension of a standard microscope slide as defined above. By the term "smaller than" is meant that the dimension is at least about 90%, at least about 85%, at least about 80%, at least about 75%, at least about 70%, at least about 65%, at least about 60%, at least about 55%, at least about 50%, at least about 45%, at least about 40%, at least about 35%, at least about 30%, at least about 25%, at least about 20%, at least about 15%, at least about 10%, at least about 5% smaller than the corresponding dimension of the standard microscope slide. Furthermore, more than one dimension of the non-standard size slide may be smaller than corresponding dimensions of a standard microscope slide in which case each smaller dimension of the non-standard size slide is independently smaller. For example, by way of illustration and not limitation, a non-standard size slide may be smaller in length by about 80% and smaller in width by about 40%.

Typically, the individual support has a length of less than about 0.2 inches, less than about 0.3 inches, less than about 0.4 inches, less than about 0.5 inches, less than about 0.6 inches, less than about 0.7 inches, less than about 0.8 inches, less than about 0.9 inches, less than about 1.0 inches, less than about 1.1 inches, less than about 1.2 inches, less than about 1.3 inches, less than about 1.4 inches, less than about 1.5 inches, less than about 1.6 inches, less than about 1.7 inches, less than about 1.8 inches, less than about 1.9 inches, less than about 2.0 inches, less than about 2.1 inches, less than about 2.2 inches, less than about 2.3 inches, less than about 2.4 inches, less than about 2.5 inches, less than about 2.6 inches, less than about 2.7 inches, less than about 2.8 inches, about 2.9 inches. In some embodiments the length of the individual support is in the range of about 0.5 to about 2.5 inches, about 0.8 to about 2.2 inches, about 1.0 to about 2.0 inches.

The individual support has a width of less than about 0.2 inches, less than about 0.3 inches, less than about 0.4 inches, less than about 0.5 inches, less than about 0.6 inches, less than about 0.7 inches, less than about 0.8 inches, less than about 0.9 inches, less than about 1.0 inches, less than about 1.1 inches, less than about 1.2 inches, less than about 1.3 inches, less than about 1.4 inches, less than about 1.5 inches, less than about 1.6 inches, less than about 1.7 inches, less than about 1.8 inches, less than about 1.9 inches, less than about 2.0 inches In some embodiments the individual support has a width in the range of about 0.5 to about 1.5 inches, about 0.8 to about 1.2 inches, about 0.9 to about 1.1 inches.

Any of a variety of geometries of arrays on a support may be used. As mentioned above, an individual support usually contains a single array. Features of the array may be arranged in rectilinear rows and columns. This is particularly attractive for single arrays on a support. The configuration of the arrays and their features may be selected according to manufacturing, handling, and use considerations.

Regardless of the geometry of the array on the surface of an individual support or on the surface of a sheet comprising a multiple of individual supports, the arrays normally do not comprise the entire surface of the sheet or of the support. For sheets of material comprising a multiple of individual supports, the sheet typically has a border along its longitudinal edges that is about 0.5 to about 3 mm wide, usually, about 1 to about 2 mm wide. In many embodiments, the border of the individual supports obtained from the sheet has the same dimensions as the border for the sheet.

In some embodiments one area of the individual support that is a non-interfeature area or a portion of a border or a combination thereof comprises an identifier such as, e.g., a bar code. It is often desirable to have some type of identification on the array substrate that allows matching a particular array to layout information, since array layout information in some form is used to meaningfully interpret the information obtained from interrogating the array. Unique identifiers and their generation have been previously described, such as in U.S. Pat. Nos. 5,812,793, 5,404,523, and the references cited therein. Such unique identifiers (often referred to as "Globally Unique Identifiers" or "GUIDs", or "Universally Unique Identifiers" or "UUIDs") can, for example, include a network card identification, which is specific to that card, along with a time and local counter number, and other components.

Use of such unique identifiers in association with array layouts generated at the same or different locations would virtually eliminate the possibility of the same identifier being associated with different array layouts. However, such unique identifiers typically require 128 bit data string. A string of such length when written, for example, as a bar code, typically takes up about 3 to 4 cm, which is not consistent with the size of the individual supports disclosed herein. However, U.S. Pat. No. 6,180,351 (Cattell) issued Jan. 30, 2001, describes an approach wherein a second identifier is employed of shorter length than a corresponding unique identifier, and which is associated in some manner with the unique identifier. The second identifier is placed on the individual support in a location not occupied by features of the array. The disclosure of U.S. Pat. No. 6,180,351 is incorporated herein by reference in its entirety.

As mentioned above, in some embodiments the non-standard size slide is used in conjunction with a holder, which has a slide holding section that has dimensions comparable with a standard microscope slide. This permits the present slides to be processed by known equipment designed for processing of slides having dimensions of a standard microscope slide. Such processing instruments include, by way of illustration and not limitation, array scanners or readers, hybridization chambers, loading devices for applying samples to arrays, systems for carrying out hybridization and washing steps, and so forth.

In one embodiment the holder is a holder for carrying out a washing step, which holder in one embodiment has a body with side portions and a channel intermediate the side portions, which channel extends in a direction between ends of the body. In this case, the backer member may be a bottom surface of the channel. In such a configuration, the front and rear clamp member sets may have their members disposed about the channel, and one of those sets may have its members fixed to the body side portions while the other set is movable to an open position away from the fixed set. For example, the front clamp member set may be fixed to the body side portions and the rear clamp member set may be movable. In this case, the slide is retained in the mounted position by being urged against the fixed clamp member set.

This holder has a body which is generally rectangular in shape and includes two opposed side portions with a channel positioned therebetween, and extending in a direction between the ends of the body. The channel has a bottom surface which acts as a backer member, and has a closed leading end and an open trailing end. The opposed sides of the channel have ledges running the length of the sides. Portions of the ledges act as a movable set of rear clamp members, as will shortly be described. Four tabs positioned about the channel, have outside portions attached to the side portions and the inside portions which extend over the 22 and are slightly spaced therefrom in a normal position of the 22. The inside portions act as a front set of fixed clamp members which are fixed to the side portions. Positioned outside the channel on the front side of holder, is a control member set consisting of two control members in the form of buttons each of which is positioned and movable within an opening in a front surface of the corresponding side portion. Each control member is connected to the channel (including the ledges) such that moving the control members rearward causes the channel to also move rearward, thereby moving the ledges (portions of which, beneath inside the portions of the tabs, act as the rear clamp member set) away from the portions of tabs (which act as the fixed front clamp member set) to an open position. That is, pressing down on the buttons moves the clamp member sets to an open position. Four springs resiliently urge the channel and hence the ledges forward toward one another (thereby urging the rear clamp member, composed of portions of the ledges, to the normal position).

The non-standard size slide is mounted in a slide holder and retained thereon in a mounted position without the array contacting the holder. The slide holder is then inserted into a known processing instrument that is designed for processing standard microscope slides or for slides of other dimensions as the case may be. The slide holder may be of any design as long as the slide holder has a slide holding section that is adapted to dispose the non-standard size slide to the processing instrument in a manner similar to that for a standard size slide. The determining factor is the dimensions of a device that is accommodated by a particular known processing instrument. As mentioned above, such instruments are usually designed for standard microscope slides. However, in general, the present invention has the flexibility to employ a slide holder that has a slide holding section with dimensions that are accommodated by a particular processing instrument, which may be other than that of a standard microscope slide.

The phrase "adapted to dispose" is used herein to mean that the configuration of the slide holding section of the slide holder comprises various members such as retaining members, adjusting members, grooves, indentations, wall members, and so forth to present the non-standard size slide to the processing instrument in a manner similar to that for a standard size slide or a slide for which the processing instrument is designed. The non-standard size slide is disposed to the processing instrument in a manner similar to that for a standard size slide where the processing instrument can receive the slide holder with the non-standard size slide without modification to the processing instrument and that an array and/or an identifier or the like on the surface of the slide can be processed by the instrument as if such array and/or identifier or the like were on the surface of a standard size slide.

In some embodiments the slide holding section is adapted to dispose an identifier on a non-standard size slide to the processing instrument in the same or similar manner as an identifier on a standard size slide. The processing instrument comprises hardware and software to perform the function of reading the identifier and sending information to the appropriate processing components of the processing instrument to indicate where an array is found on the surface of the non-standard size slide and when to start and stop the processing of the array. Typically, the processing instrument is adapted to process an array on a slide or some other function by a combination of hardware and software. This includes the structure of a particular component of the processing instrument and may also include a microprocessor, embedded real-time software and I/O interface electronics to control a sequence of operations and so forth.

In some embodiments the slide holder has a slide holding section that is adjustable. In these embodiments the slide holder comprises various components that permit the slide holding section to be adjusted to receive and retain a non-standard size slide of any non-standard size smaller than a standard size slide. Of course, the adjustable nature of the slide holding section should permit a non-standard size slide to be disposed to the processing instrument in a manner similar to that for a standard size slide. An adjustable slide holding section may be realized using various components such as sliding wall members, movable retaining members, and so forth.

Various embodiments of a slide holder are discussed next by way of illustration and not limitation. In one embodiment the slide holder comprises a slide holding section that is generally planar and has a receiving portion that receives a non-standard size slide. The slide holder itself may be planar or of some other shape as long as the slide holding section has a shape and dimensions that are accommodated by the processing instrument in question. The receiving portion may be in the form of a cut out portion in the slide holding section where the dimensions of the cut out portion are the same as or slightly larger than the dimensions of the non-standard size slide. The cut out portion may be fully or partially open. As discussed more fully below, when the latter, the slide holding portion may include a backer member that limits access to the cut out portion to a direction other than where the backing member is situated in the device. In some embodiments the slide holding section may comprise various movable members so that a slide-receiving portion of the slide holding section may be adjusted to accommodate a non-standard size slide of any size smaller than a standard size slide.

The receiving portion of the slide holding section is designed so that the non-standard size slide is placed in the receiving portion by sliding, direct insertion, and the like. The sides of the receiving portion usually comprise retaining means for retaining the slide in the slide holding section. The retaining means may comprise one or more retaining members. For example, the sides of the receiving portion may comprise one or more grooves, retaining buttons, channels, or the like for receiving and/or seating the non-standard size slide. In one aspect and as mentioned above, the slide holder comprises an adaptor portion for varying the size of the cut out portion to adapt to the dimensions of the non-standard slide (e.g., to provide a receiving portion that is the same or slightly larger than the dimensions of the non-standard size slide).

In the instance where receiving portion comprises a cut out portion that is only a partial cut out, a part of the slide holding section remains in the area of the cut out. For example, the cut out portion may be a recess in the slide holding section designed so that the non-standard size slide may be seated in the recess and only one surface of the slide faces outwardly, i.e., away from the inside of the recess. As above, the sides of the cut out portion may comprise retaining means or the like as discussed above.

The slide holder, in one embodiment, may have a body with side portions and a channel intermediate the side portions. The channel extends in a direction between ends of the body. In this case, the backer member may be a bottom surface of the channel. In such a configuration, front and rear clamp member sets may have their members disposed about the channel, and one of those sets may have its members fixed to the body side portions while the other set is movable to an open position away from the fixed set. For example, the front clamp member set may be fixed to the body side portions and the rear clamp member set may be movable. In this case, the slide is retained in the mounted position by being urged against the fixed clamp member set. It should be noted that the terms "front" and "rear" are relative terms based upon the orientation of the viewer and such terms should not be considered limiting to the scope of the slide holder discussed herein.

The slide holder may further comprise a control member set positioned on an accessible location on the holder, for example at a position outside the channel. The member set is moved to move the movable clamp set to the open position. In the case where the movable clamp set is the rear clamp member set, the control member may simply be moved rearward to move the rear clamp member set to the open position.

In the holder configuration where the body has the channel as described above, the slide may be mounted on the holder by sliding the slide in an endways direction of the channel and into the mounted position in which a leading end of the slide abuts the closed end of the channel. Clamp member sets positioned about the channel, may be held in the open position during such a mounting procedure (for example, by the control member set rearward).

The slide holder may additionally have two spaced apart guides extending from the body adjacent respective sides of the channel. With this configuration the slide may be slid into the mounted position along the guides. The guides may be dimensioned such that, when the slide is in the mounted position, a trailing end of the slide is positioned between the guides. During any mounting of the slide portions of the slide, portions of the slide front and rear surfaces may be gripped (such as with a user's fingers) and the gripped portions used to then slide the slide into the mounted position. The guides, in such case may be dimensioned such that the gripped portions are positioned between the guides when the slide is in the mounted position.

The slide holder may optionally additionally include means for ready removal of the slide from the mounted position. In some embodiments, the removing step includes gripping portions of the slide front and rear surfaces, which are between the guides, and using the gripped portions to slide the slide in an endways direction opposite to that in which the slide was slid during the slide mounting.

The present invention, then, provides a holder for a non-standard sized slide, which holder has any of the features already described above. In one embodiment, the holder may include a backer member and the clamp sets as described above. The clamp members may be positioned such that the holder can receive and retain a slide having an area of no more than 200 cm² (or no more than 100 cm² or even no more than 50 or 40 cm²). The holder may also be dimensioned such that the moieties on the rear side of the mounted slide are spaced from the backer member by between 0.1 mm to 10 mm (or more preferably between 0.5 and 5 or 3 mm). As mentioned above, the holder itself may have various shapes, for example, rectangular. In one aspect, the holder will have a maximum area of a side that is no more than 300 cm² (or preferably no more than 200 cm² or 100 cm²). When a channel is present in the holder it may, for example, be no wider than 20 cm² (or no wider than 15 cm², 10 cm², or 5 cm²).

In some embodiments, the present invention provides a transparent non-standard size slide having opposed front and rear surfaces, the slide carrying moieties such as an array of biopolymers on a rear surface and an identifier on a front surface. The identifier may be, for example, a bar code, which is printed on an opaque label attached to the front side of the slide. In some embodiments, the array on the surface of the slide is read through the front surface and the identification code is read from a front side.

Alternatively, as mentioned above, in some embodiments, the holder may be used with an array of the mounted slide located on a forward facing surface (that is, away from the holder). While the surface protection benefit is lost in this configuration, the benefits of ease of handling and physical protection of the slide are retained. One may wish to read the array on a forward facing side of the slide to allow for various opaque slides, mirrored slides or to avoid the issues of thickness variations in transparent slides (that is, arrays on a backward facing surface of a slide which are read through the slide from the front side, may be on different focal planes of the scanner in the case where the thickness of the transparent slide varies).

Different embodiments of methods and devices of the present invention can provide any or more of a number of useful features. For example, moieties on the slide (such as the exposed array) can be protected from damage and the slide itself protected from breakage. Background signals during array reading may be reduced by the use of a backer member. Further, it may be relatively easy to use devices of the present invention and extensive manipulations of the slide may be avoided, while relatively precise positioning of the slide (and hence the moieties) in a reader may be obtained for assisting in the reading of the exposed array.

The surface of the slide facing outwardly may be the surface comprising the array of features. Alternatively, depending on the nature of the processing step, the surface of the slide facing outwardly may be that opposite to the surface with the array, in which instance the surface comprising the array of features faces inwardly, i.e., toward the inside of the recess. The recess may be designed so that there is a space between the wall of the recess and the surface of the slide. In this way a chamber is formed when the non-standard size slide is inserted into the recess. The chamber may be used for carrying out a processing step on the array of features on the surface of the slide. The slide holder may comprise one or more inlets and outlets for introducing reagents into the chamber in this embodiment.

The slide holder may be manufactured from one or more of a number of materials. The requirements of the material include providing physical integrity for the slide, allowing manipulation of the slide into and out of a processing instrument, chemical properties including inertness and stability, appearance, and so forth. Such materials include, for example, materials discussed above for the manufacture of the slide. In some embodiments the material from which the slide holder is manufactured is an opaque plastic, e.g., ABS black plastic, etc., and the like. Where the cut out portion is only partially cut out, the remaining portion of the slide holder that faces the slide may be a transparent material as defined above to allow, for example, for interrogation or examination of the surface of the slide that faces the remaining portion. The holder may be made in sections such as, for example, two, three or more molded sections.

Embodiments of the invention are next described by way of illustration and not limitation with reference to the attached drawings. FIG. 1 depicts sheet 10 of slide material that is approximately 6 inches by 6 inches. Sheet 10 is divided by score lines 12 into 18 non-standard size slides 14 of approximately, usually, exactly, equal dimensions, each slide being about 1 inch by about 2 inches. It should be noted that a substrate of approximately the same size as above would be divided into regions corresponding to 12 standard-size (i.e., 1 inch by 3 inch) slides.

Figure 2:
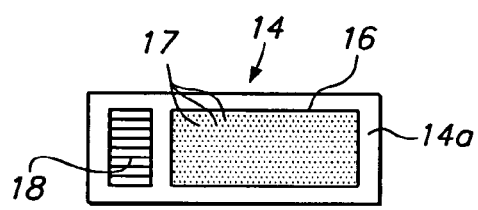
FIG. 2 is a depiction of a single non-standard size slide shown in FIG. 1.
Figure 3:
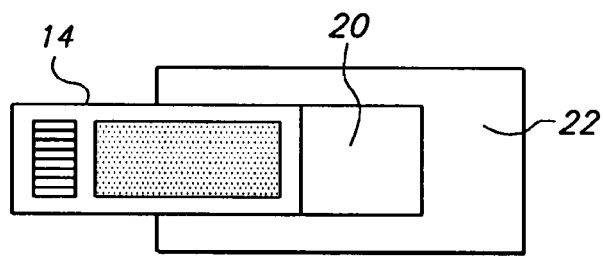
FIG. 3 is a depiction of a single non-standard size slide partially inserted into a slide holder in accordance with embodiments of the present invention that has as slide holding section adapted to dispose the non-standard size slide to a processing instrument in a manner similar to that for a standard size slide.

An individual slide 14 is depicted in FIG. 2 and has array 16 comprising array features 17 and identifier 18. FIG. 3 depicts slide 14 partially inserted into slide holding section 20 of slide holder 22. The dimensions of slide holder 22 permit slide holder 22 to be inserted and retained in a processing instrument designed for processing standard microscope slides. Accordingly, the outer dimensions of slide holder 22 are the same as or approximately the same as the outer dimensions of a slide holder for a standard size slide. The dimensions of slide holding section 20 are such as to receive and retain non-standard size slide 14. In this way, slide holder 22 may be received in a known processing apparatus in many instances designed for processing standard microscope slides.

Figure 4:
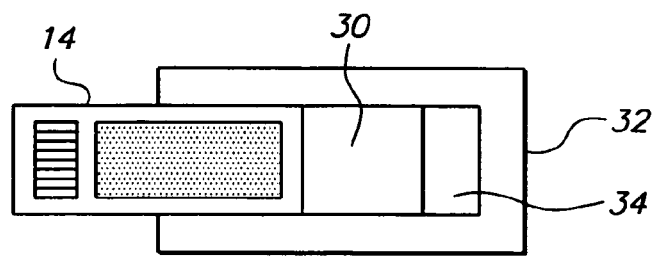
FIG. 4 is a depiction of a single non-standard size slide partially inserted into a slide holder in accordance with embodiments of the present invention that has as slide holding section adapted to dispose the non-standard size slide to a processing instrument in a manner similar to that for a standard size slide where the slide holding section is adjustable.

FIG. 4 depicts slide 14 partially inserted into slide holding section 30 of slide holder 32. Slide holder 32 also comprises adjustable member 34, which is designed to permit slide holding section 30 to be adjusted to receive and retain slide 14. The dimensions of slide holder 32 permit slide holder 32 to be inserted and retained in a processing instrument designed for processing standard microscope slides. Accordingly, the outer dimensions of slide holder 32 are the same as or approximately the same as the outer dimensions of a slide holder for a standard size slide. The dimensions of slide holding section 30 may receive and retain non-standard size slide 14 of any size smaller that a standard size slide by positioning adjustable member 34 in an appropriate position. In this way, slide holder 32 may be received in a known processing apparatus in many instances designed for processing standard microscope slides and a non-standard size slide of any non-standard size may be processed in the known processing apparatus.

For example, holder 22 with mounted slide 14 may be inserted into a processing instrument such as, for example, a reader, such as a laser scanner, which has a suitable mounting means for receiving and releasably retaining holder 22 in a known position. In some embodiments the scanner is able to read the location and intensity of fluorescence at each feature of an array following exposure to a fluorescently labeled sample (such as a polynucleotide containing sample). For example, such a scanner may be similar to the G2565® DNA microarray scanner available from Agilent Technologies, Inc., Palo Alto, Calif. The array 16 may then be read through front side 14a of slide 14. Usually, a scanning interrogating laser beam (not shown) is directed through a beam splitter and then through front side 14a and scanned across array 16. Resulting fluorescent signals from the array that have passed back through slide 14 and out through front side 14a may then be detected at a detector. Results from the interrogation can be processed such as by rejecting a reading for a feature that is below a predetermined threshold and/or forming conclusions based on the pattern read from the array (such as whether or not a particular target sequence may have been present in the sample). The results of the interrogation or processing can be forwarded (such as by communication) to a remote location if desired, for further use.

As mentioned above, the reading may include directing a light beam through the slide from the front side and onto the array on the rear side, and detecting a resulting signal from the array, which has passed from the rear side through the slide and out the slide front side.

The holder may further include retaining means such as, e.g., front and rear clamp sets, which can be moved apart to receive the slide between the sets. In this case, the slide is retained in the mounted position by the clamp sets being urged (such as resiliently, for example by one or more springs) against portions of the front and rear surfaces, respectively. The clamp sets may, for example, be urged against the slide front and rear surfaces of a mounted slide at positions adjacent a periphery of that slide. Alternatively, the array may be read on the front side when the slide is positioned in the holder with the array facing forward (that is, away from the holder).

Identifier 18 may be read from the front side of slide 14 by a bar code reader where the identifier is a bar code. The identifier is usually placed in a location that does not interfere with the processing of the arrays. Information from the read bar code can be used to retrieve array layout information, which can be used in the reading and/or processing of the interrogation results. After the reading of array 18 is complete, the holder 22 may be removed from the scanner. A user may now remove slide 14 for storage or disposal. Removal of slide 14 from holder 22 depends on the particular design of the slide holding portion of the slide holder. Such removal may involve, among others, disengaging any retaining means and removing the slide by prying, sliding, applying pressure or force, releasing restraints, and the like.

Any suitable examining approach may be utilized. The nature of the examining device including a detector for examining the array for the results of one or more chemical reactions is dependent on the nature of the chemical reactions including any label employed for detection, such as fluorescent as mentioned above, chemiluminescent, colorimetric based on an attached enzyme, and the like. As mentioned above, the examining device may be a scanning device involving an imaging system or optical system. Other known examining devices may be employed. Such devices may involve the use of other optical techniques (for example, optical techniques for detecting chemiluminescent or electroluminescent labels) or electrical techniques (where each feature is provided with an electrode to detect hybridization at that feature in a manner disclosed in U.S. Pat. Nos. 6,221,583 and 6,251,685, and elsewhere). Other examining techniques include visual inspection techniques, non-light based methods, and so forth.

Prior to reading an array, the array is contacted with a sample to be analyzed. In one approach involving polynucleotide analysis, cell matter is lysed, to release its DNA and RNA as fragments, which are then separated out by gel filtration, membrane purification, precipitation, solvent extraction, electrophoresis or other means, and then tagged with a fluorescent or other label. The nucleic acid mix is exposed to the array of oligonucleotide probes, whereupon selective attachment to matching probe sites takes place. The array is then washed and the result of exposure to the array is determined. In this particular example, the array is imaged by scanning the surface of the support so as to reveal for analysis and interpretation the sites where attachment occurred.

The signal referred to above may arise from any moiety that may be incorporated into the sample being analyzed for the purpose of detection. Often, a label is employed, which may be a member of a signal producing system. The label is capable of being detected directly or indirectly. In general, any reporter molecule that is detectable can be a label. Labels include, for example, (i) reporter molecules that can be detected directly by virtue of generating a signal, (ii) specific binding or reacting pair members that may be detected indirectly by subsequent binding or reacting to a cognate that contains a reporter molecule, (iii) mass tags detectable by mass spectrometry, (iv) oligonucleotide primers that can provide a template for amplification or ligation, (v) specific labeled nucleotide monomers which are incorporated into the target samples by enzymatic or chemical incorporation means, and (vi) a specific polynucleotide sequence or recognition sequence that can act as a ligand such as for a repressor protein, wherein in the latter two instances the oligonucleotide primer or repressor protein will have, or be capable of having, a reporter molecule and so forth. The reporter molecule can be a catalyst, such as an enzyme, a polynucleotide coding for a catalyst, promoter, dye, fluorescent molecule, chemiluminescent molecule, coenzyme, enzyme substrate, radioactive group, a small organic molecule, amplifiable polynucleotide sequence, a particle such as latex or carbon particle, metal sol, crystallite, liposome, cell, etc., which may or may not be further labeled with a dye, catalyst or other detectable group, a mass tag that alters the weight of the molecule to which it is conjugated for mass spectrometry purposes, and the like.

The signal may be produced by a signal producing system, which is a system that generates a signal that relates to the presence or amount of a target polynucleotide in a medium. The signal producing system may have one or more components, at least one component being the label. The signal producing system includes all of the reagents required to produce a measurable signal. The signal producing system provides a signal detectable by external means, by use of electromagnetic radiation, desirably by visual examination.

The arrays prepared as described above are particularly suitable for conducting hybridization reactions. Such reactions are carried out on an array comprising a plurality of features relating to the hybridization reactions. The array is exposed to liquid samples and to other reagents for carrying out the hybridization reactions. The support surface exposed to the sample is incubated under conditions suitable for hybridization reactions to occur.

After the appropriate period of time of contact between the liquid sample and the array, the contact is discontinued and various processing steps are performed. Following the processing step(s), the array is moved to an examining device as discussed above where the array is interrogated.

Results from the reading may be raw results (such as fluorescence intensity readings for each feature in one or more color channels) or may be processed results such as obtained by rejecting a reading for a feature that is below a predetermined threshold and/or forming conclusions based on the pattern read from the array (such as whether or not a particular target sequence may have been present in the sample). The results of the reading (processed or not) may be forwarded (such as by communication) to a remote location if desired, and received there for further use (such as further processing).

When one item is indicated as being "remote" from another, this means that the two items are at least in different buildings and may be at least one mile, ten miles, or at least one hundred miles apart. "Communicating" information references transmitting the data representing that information as electrical signals over a suitable communication channel (for example, a private or public network). "Forwarding" an item refers to any means of getting that item from one location to the next, whether by physically transporting that item or otherwise (where that is possible) and includes, at least in the case of data, physically transporting a medium carrying the data or communicating the data.

As mentioned above, in the present invention, the surface of the individual support normally has only one array. Depending upon intended use, the array may contain multiple spots or features of chemical compounds such as, e.g., biopolymers in the form of polynucleotides or other biopolymer. A typical array on an individual support may contain more than ten, more than one hundred, more than five hundred, more than one thousand, more than fifteen hundred, more than two thousand, more than twenty five hundred features. In many embodiments the number of features on the individual supports is in the range of about 100 to about 25,000, about 200 to about 20,000, about 300 to about 15,000, about 500 to about 10,000, about 1000 to about 3000, about 1500 to about 2500, about 1800 to about 2200. The features may occupy an area of less than 20 $cm^2$ or even less than 10 $cm^2$. For example, features may have widths (that is, diameter, for a round spot) in the range from a 10 µm to 1.0 cm. In other embodiments each feature may have a width in the range of 1.0 µm to 1.0 mm, usually 5.0 µm to 500 µm, and more usually 10 µm to 200 µm. Non-round features may have area ranges equivalent to that of circular features with the foregoing width (diameter) ranges.

In comparison, standard microscope slides may, and usually do, contain more than one array. The number of features on the standard microscope slide may be more than 20,000, more than 25,000, more than 30,000, more than 35,000, more than 40,000, more than 50,000, more than 75,000, or more than 100,000 features.

Each feature, or element, within the molecular array is defined to be a small, regularly shaped region of the surface of the substrate. The features are arranged in a predetermined manner. Each feature of an array usually carries a predetermined chemical compound or mixtures thereof. Each feature within the molecular array may contain a different molecular species, and the molecular species within a given feature may differ from the molecular species within the remaining features of the molecular array. Some or all of the features may be of different compositions. Each array may contain multiple spots or features separated by spaces or areas that have no features. Such interfeature areas are usually present but are not essential. As with the border areas discussed above, these interfeature areas do not carry any chemical compound such as polynucleotide (or other biopolymer of a type of which the features are composed). Interfeature areas typically will be present where arrays are formed by the conventional in situ process or by deposition of previously obtained moieties, as described above, by depositing for each feature at least one droplet of reagent such as from a pulse jet (for example, an inkjet type head) but may not be present when, for example, photolithographic array fabrication processes are used. It will be appreciated though, that the interfeature areas, when present, could be of various sizes and configurations.

As mentioned above, in the present methods individual supports are prepared having a plurality of chemical compounds in the form of an array on the surface of such supports. The chemical compounds may be deposited on the surface of the support as fully formed moieties. On the other hand, the chemical compounds may be synthesized in situ in a series of steps such as, for example, the addition of building blocks, which are chemical components of the chemical compound. Examples of such building blocks are those found in the synthesis of polymers. The invention has particular application to chemical compounds that are biopolymers such as polynucleotides, for example, oligonucleotides.

As referred to above, embodiments of the invention have particular application to supports bearing oligomers or polymers. The oligomer or polymer is a chemical entity that contains a plurality of monomers. It is generally accepted that the term "oligomers" is used to refer to a species of polymers. The terms "oligomer" and "polymer" may be used interchangeably herein. Polymers usually comprise at least two monomers. Oligomers generally comprise about 6 to about 20,000 monomers, preferably, about 10 to about 10,000, more preferably about 15 to about 4,000 monomers. Examples of polymers include polydeoxyribonucleotides, polyribonucleotides, other polynucleotides that are C-glycosides of a purine or pyrimidine base, or other modified polynucleotides, polypeptides, polysaccharides, and other chemical entities that contain repeating units of like chemical structure. Exemplary of oligomers are oligonucleotides and peptides.

A monomer is a chemical entity that can be covalently linked to one or more other such entities to form an oligomer or polymer. Examples of monomers include nucleotides, amino acids, saccharides, peptoids, and the like and subunits comprising nucleotides, amino acids, saccharides, peptoids and the like. The subunits may comprise all of the same component such as, for example, all of the same nucleotide or amino acid, or the subunit may comprise different components such as, for example, different nucleotides or different amino acids. The subunits may comprise about 2 to about 2000, or about 5 to about 200, monomer units. In general, the monomers have first and second sites (e.g., C-termini and N-termini, or 5' and 3' sites) suitable for binding of other like monomers by means of standard chemical reactions (e.g., condensation, nucleophilic displacement of a leaving group, or the like), and a diverse element that distinguishes a particular monomer from a different monomer of the same type (e.g., an amino acid side chain, a nucleotide base, etc.). The initial substrate-bound, or support-bound, monomer is generally used as a building block in a multi-step synthesis procedure to form a complete ligand, such as in the synthesis of oligonucleotides, oligopeptides, oligosaccharides, etc. and the like.

A biomonomer references a single unit, which can be linked with the same or other biomonomers to form a biopolymer (for example, a single amino acid or nucleotide with two linking groups one or both of which may have removable protecting groups). A biomonomer fluid or biopolymer fluid refers to a liquid containing either a biomonomer or biopolymer, respectively (typically in solution).

A biopolymer is a polymer of one or more types of repeating units. Biopolymers are typically found in biological systems and particularly include polysaccharides (such as carbohydrates), and peptides (which term is used to include polypeptides, and proteins whether or not attached to a polysaccharide) and polynucleotides as well as their analogs such as those compounds composed of or containing amino acid analogs or non-amino acid groups, or nucleotide analogs or non-nucleotide groups. This includes polynucleotides in which the conventional backbone has been replaced with a non-naturally occurring or synthetic backbone, and nucleic acids (or synthetic or naturally occurring analogs) in which one or more of the conventional bases has been replaced with a group (natural or synthetic) capable of participating in Watson-Crick type hydrogen bonding interactions.

Polynucleotides are compounds or compositions that are polymeric nucleotides or nucleic acid polymers. The polynucleotide may be a natural compound or a synthetic compound. Polynucleotides include oligonucleotides and are comprised of natural nucleotides such as ribonucleotides and deoxyribonucleotides and their derivatives although unnatural nucleotide mimetics such as 2'-modified nucleosides, peptide nucleic acids and oligomeric nucleoside phosphonates are also used. The polynucleotide can have from about 2 to 5,000,000 or more nucleotides. Usually, the oligonucleotides are at least about 2 nucleotides, usually, about 5 to about 100 nucleotides, more usually, about 10 to about 50 nucleotides, and may be about 15 to about 30 nucleotides, in length. Polynucleotides include single or multiple stranded configurations, where one or more of the strands may or may not be completely aligned with another.

A nucleotide refers to a sub-unit of a nucleic acid and has a phosphate group, a 5 carbon sugar and a nitrogen containing base, as well as functional analogs (whether synthetic or naturally occurring) of such sub-units which in the polymer form (as a polynucleotide) can hybridize with naturally occurring polynucleotides in a sequence specific manner analogous to that of two naturally occurring polynucleotides. For example, a "biopolymer" includes DNA (including cDNA), RNA, oligonucleotides, and PNA and other polynucleotides as described in U.S. Pat. No. 5,948,902 and references cited therein (all of which are incorporated herein by reference), regardless of the source. An "oligonucleotide" generally refers to a nucleotide multimer of about 10 to 100 nucleotides in length, while a "polynucleotide" includes a nucleotide multimer having any number of nucleotides.

The nature of the support or substrate to which a plurality of chemical compounds is attached is discussed above. The support can be hydrophilic or capable of being rendered hydrophilic or it may be hydrophobic. The support is usually glass such as flat glass whose surface has been chemically activated for binding thereto or synthesis thereon, glass available as Bioglass and the like. The surface of a support is normally treated to create a primed or functionalized surface, that is, a surface that is able to support the attachment of a fully formed chemical compound or the synthetic steps involved in the production of the chemical compound on the surface of the support. Functionalization relates to modification of the surface of a support to provide a plurality of functional groups on the support surface. By the term "functionalized surface" is meant a support surface that has been modified so that a plurality of functional groups are present thereon usually at discrete sites on the surface. The manner of treatment is dependent on the nature of the chemical compound to be synthesized and on the nature of the support surface. In one approach a reactive hydrophilic site or reactive hydrophilic group is introduced onto the surface of the support. Such hydrophilic moieties can be used as the starting point in a synthetic organic process.

In one embodiment, the surface of the support, such as a glass support, is siliceous, i.e., the surface comprises silicon oxide groups, either present in the natural state, e.g., glass, silica, silicon with an oxide layer, etc., or introduced by techniques well known in the art. One technique for introducing siloxyl groups onto the surface involves reactive hydrophilic moieties on the surface. These moieties are typically epoxide groups, carboxyl groups, thiol groups, and/or substituted or unsubstituted amino groups as well as a functionality that may be used to introduce such a group such as, for example, an olefin that may be converted to a hydroxyl group by means well known in the art. One approach is disclosed in U.S. Pat. No. 5,474,796 (Brennan), the relevant portions of which are incorporated herein by reference. A siliceous surface may be used to form silyl linkages, i.e., linkages that involve silicon atoms. Usually, the silyl linkage involves a silicon-oxygen bond, a silicon-halogen bond, a silicon-nitrogen bond, or a silicon-carbon bond.

Another method for attachment is described in U.S. Pat. No. 6,219,674 (Fulcrand, et al.). A surface is employed that comprises a linking group consisting of a first portion comprising a hydrocarbon chain, optionally substituted, and a second portion comprising an alkylene oxide or an alkylene imine wherein the alkylene is optionally substituted. One end of the first portion is attached to the surface and one end of the second portion is attached to the other end of the first portion chain by means of an amine or an oxy functionality. The second portion terminates in an amine or a hydroxy functionality. The surface is reacted with the substance to be immobilized under conditions for attachment of the substance to the surface by means of the linking group.

Another method for attachment is described in U.S. Pat. No. 6,258,454 (Lefkowitz, et al.). A solid support having hydrophilic moieties on its surface is treated with a derivatizing composition containing a mixture of silanes. A first silane provides the desired reduction in surface energy, while the second silane enables functionalization with molecular moieties of interest, such as small molecules, initial monomers to be used in the solid phase synthesis of oligomers, or intact oligomers. Molecular moieties of interest may be attached through cleavable sites.

A procedure for the derivatization of a metal oxide surface uses an aminoalkyl silane derivative, e.g., trialkoxy 3-aminopropylsilane such as aminopropyltriethoxy silane (APS), 4-aminobutyltrimethoxysilane, 4-aminobutyltriethoxysilane, 2-aminoethyltriethoxysilane, and the like. APS reacts readily with the oxide and/or siloxyl groups on metal and silicon surfaces. APS provides primary amine groups that may be used to carry out the present methods. Such a derivatization procedure is described in EP 0 173 356 B1, the relevant portions of which are incorporated herein by reference. Other methods for treating the surface of a support will be suggested to those skilled in the art in view of the teaching herein.

The devices and methods of the present invention are particularly useful for the preparation of individual supports with an array of biopolymers. An array includes any one-, two- or three-dimensional arrangement of addressable regions bearing a particular biopolymer such as polynucleotides, associated with that region. An array is addressable in that it has multiple regions of different moieties, for example, different polynucleotide sequences, such that a region or feature or spot of the array at a particular predetermined location or address on the array can detect a particular target molecule or class of target molecules although a feature may incidentally detect non-target molecules of that feature.

Normally, the surface of the support opposite the surface with the array (opposing surface) does not carry any arrays. The arrays can be designed for testing against any type of sample, whether a trial sample, a reference sample, a combination of the foregoing, or a known mixture of components such as polynucleotides, proteins, polysaccharides and the like (in which case the arrays may be composed of features carrying unknown sequences to be evaluated).

The devices and methods of the present invention are particularly useful in the preparation of individual supports with oligonucleotide arrays for determinations of polynucleotides. As explained briefly above, in the field of bioscience, arrays of oligonucleotide probes, fabricated or deposited on a surface of a support, are used to identify DNA sequences in cell matter. The arrays generally involve a surface containing a mosaic of different oligonucleotides or sample nucleic acid sequences or polynucleotides that are individually localized to discrete, known areas of the surface.

As mentioned above, biopolymer arrays can be fabricated by depositing previously obtained biopolymers (such as from synthesis or natural sources) onto a substrate, or by in situ synthesis methods. The in situ method for fabricating a polynucleotide array typically follows, at each of the multiple different addresses at which features are to be formed, the same conventional iterative sequence used in forming polynucleotides from nucleoside reagents on a support by means of known chemistry. This iterative sequence is as follows: (a) coupling a selected nucleoside through a phosphite linkage to a functionalized support in the first iteration, or a nucleoside bound to the substrate (i.e. the nucleoside-modified substrate) in subsequent iterations; (b) optionally, but preferably, blocking unreacted hydroxyl groups on the substrate bound nucleoside; (c) oxidizing the phosphite linkage of step (a) to form a phosphate linkage; and (d) removing the protecting group ("deprotection") from the now substrate bound nucleoside coupled in step (a), to generate a reactive site for the next cycle of these steps. The functionalized support (in the first cycle) or deprotected coupled nucleoside (in subsequent cycles) provides a substrate bound moiety with a linking group for forming the phosphite linkage with a next nucleoside to be coupled in step (a). A number of reagents involved in the above synthetic steps such as, for example, phosphoramidite reagents, are sensitive to moisture and anhydrous conditions and solvents are employed. Final deprotection of nucleoside bases can be accomplished using alkaline conditions such as ammonium hydroxide, in a known manner.

The foregoing chemistry of the synthesis of polynucleotides is described in detail, for example, in Caruthers, *Science* 230: 281-285, 1985; Itakura, et al., *Ann. Rev. Biochem.* 53: 323-356; Hunkapillar, et al., *Nature* 310: 105-110, 1984; and in "Synthesis of Oligonucleotide Derivatives in Design and Targeted Reaction of Oligonucleotide Derivatives", CRC Press, Boca Raton, Fla., pages 100 et seq., U.S. Pat. Nos. 4,458,066, 4,500,707, 5,153,319, and 5,869,643, EP 0294196, and elsewhere.

As mentioned above, various ways may be employed to introduce the reagents for producing an array of polynucleotides on the surface of a support such as a glass support. Such methods are known in the art. One such method involves solid phase chemistry, photolabile protecting groups and photolithography. Binary masking techniques are employed in one embodiment of the above. Arrays are fabricated in situ, adding one base pair at a time to a primer site. Photolithography is used to uncover sites, which are then exposed and reacted with one of the four base pair phosphoramidites. In photolithography the surface is first coated with a light-sensitive resist, exposed through a mask and the predetermined area is revealed by dissolving away the exposed or the unexposed resist and, subsequently, a surface layer. A separate mask is usually made for each predetermined area, which may involve one for each base pair in the length of the probe.

Another in situ method employs inkjet printing technology to dispense the appropriate phosphoramidite reagents and other reagents onto individual sites on a surface of a support. Oligonucleotides are synthesized on a surface of a substrate in situ using phosphoramidite chemistry. Solutions containing nucleotide monomers and other reagents as necessary such as an activator, e.g., tetrazole, are applied to the surface of a support by means of thermal ink-jet technology. Individual droplets of reagents are applied to reactive areas on the surface using, for example, a thermal ink-jet type nozzle. The surface of the support may have an alkyl bromide trichlorosilane coating to which is attached polyethylene glycol to provide terminal hydroxyl groups. These hydroxyl groups provide for linking to a terminal primary amine group on a monomeric reagent. Excess of non-reacted chemical on the surface is washed away in a subsequent step. For example, see U.S. Pat. No. 5,700,637.

Another approach for fabricating an array of biopolymers on a substrate using a biopolymer or biomonomer fluid and using a fluid dispensing head is described in U.S. Pat. No. 6,242,266 (Schleifer, et al.). The head has at least one jet that can dispense droplets onto a surface of a support. The jet includes a chamber with an orifice and an ejector, which, when activated, causes a droplet to be ejected from the orifice. Multiple droplets of the biopolymer or biomonomer fluid are dispensed from the head orifice so as to form an array of droplets on the surface of the substrate.

In another embodiment (U.S. Pat. No. 6,232,072) (Fisher) a method of, and apparatus for, fabricating a biopolymer array is disclosed. Droplets of fluid carrying the biopolymer or biomonomer are deposited onto a front side of a transparent substrate. Light is directed through the substrate from the front side, back through a substrate backside and a first set of deposited droplets on the first side to an image sensor.

An example of another method for chemical array fabrication is described in U.S. Pat. No. 6,180,351 (Cattell). The method includes receiving from a remote station information on a layout of the array and an associated first identifier. A local identifier is generated corresponding to the first identifier and associated array. The local identifier is shorter in length than the corresponding first identifier. The addressable array is fabricated on the substrate in accordance with the received layout information.

Other methods for synthesizing arrays of oligonucleotides on a surface include those disclosed by Gamble, et al., WO97/44134; Gamble, et al., WO98/10858; Baldeschwieler, et al., WO95/25116; Brown, et al., U.S. Pat. No. 5,807,522; and the like.

In accordance with the present invention and as described above, a sheet of glass, by way of illustration and not limitation, is first treated to form score lines on one of its surfaces. Next, arrays are formed on the surface of the sheet of glass in predetermined areas within the boundaries of the scored sections of the sheet of glass where each of the sections has a single array. Then, the sheet of glass is divided along to form individual supports or slides in accordance with the present invention where the slides have non-standard size dimensions. The sheet of glass may be divided by any suitable technique for physically separating portions of the sheet from other portions. For example, score lines may be made on the surface of the glass to correspond with the size of the individual supports or slides. The sheet may be divided by breaking, dicing or otherwise severing the sheet along the score lines. As is evident, such an approach may be applied to any breakable substrate employed for attaching the array features.

All publications and patent applications cited in this specification are herein incorporated by reference as if each individual publication or patent application were specifically and individually indicated to be incorporated by reference.

Although the foregoing invention has been described in some detail by way of illustration and example for purposes of clarity of understanding, it will be readily apparent to those of ordinary skill in the art in light of the teachings of this invention that certain changes and modifications may be made thereto without departing from the spirit or scope of the appended claims. Furthermore, the foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description; they are not intended to be exhaustive or to limit the invention to the precise forms disclosed. Many modifications and variations are possible in view of the above teachings. The embodiments were chosen and described in order to explain the principles of the invention and its practical applications and to thereby enable others skilled in the art to utilize the invention.

What is claimed is:

1. A system comprising:
   a) a non-standard size slide having at least one dimension that is less than that of a standard microscope slide, said non-standard slide having a single array of chemical compounds on a surface thereof;
   b) a first holder for said non-standard size slide, wherein said first holder comprises a slide-holding section dimensioned to receive said non-standard slide and wherein said first holder has the dimensions of a standard size slide; and
   c) a second holder adapted to receive said first holder, wherein said second holder comprises:
      i. a body having side portions and a channel intermediate to the side portions and extending in a direction between the ends of the body; and
      ii. front and rear clamp member sets with members disposed about the channel, one set of which is fixed to the body side portions while the other set is movable to an open position away from the fixed set, wherein said second holder is adapted such that said first holder is retained in position by being urged against the fixed clamp member set.

2. The system of claim 1, wherein said standard size slide has dimensions in the plane of the slide of one inch by 3 inches.

3. The system of claim 1, wherein said second holder is adapted to be inserted into an array reader.

4. The system of claim 1, wherein said slide holding section is adjustable to receive said non-standard slide.

5. The system of claim 1, wherein said non-standard size slide comprises 100 to about 25,000 features comprising said chemical compounds.

6. The system of claim 1, wherein said chemical compounds are biopolymers.

7. The system of claim 6, wherein said biopolymers are polynucleotides.

8. A system comprising:
   a) a non-standard size slide having at least one dimension that is less than that of a standard microscopic slide, said non-standard slide having a single array of chemical compounds on a surface thereof;
   b) a first holder for said non-standard slide, wherein said first holder comprises a slide-holding section dimensioned to receive said non-standard size slide and wherein said first holder has the dimensions of a standard size slide; and
   c) a second holder adapted to receive said first holder and comprising front and rear clamp members sets disposed about a channel such that said first holder is retained in position by being urged against one of the clamp member sets, wherein said second holder is adapted to be inserted into an array reader.

9. The system of claim 8, wherein said standard size slide has dimensions in the plane of the slide of one inch by 3 inches.

10. The system of claim 8, wherein said non-standard size slide comprises 100 to about 25,000 features comprising said chemical compounds.

11. The system of claim 8, wherein said chemical compounds are biopolymers.

12. The system of claim 11, wherein said biopolymers are polynucleotides.

13. A method comprising:
   a) inserting a non-standard size slide having at least one dimension that is less than that of a standard microscope slide, said non-standard slide having a single array of chemical compounds on a surface thereof into a first holder for said non-standard slide, wherein said first holder comprises a slide-holding section dimensioned to receive said non-standard size slide and wherein said first holder has the dimensions of a standard size slide; and
   b) inserting said first holder into a second holder adapted to receive said first holder and comprising front and rear clamp members sets disposed about a channel such that said first holder is retained in position by being urged against one of the clamp member sets, wherein said second holder is adapted to be inserted into an array reader.

14. The method of claim 13, further comprising inserting said second holder into an array reader and reading said array.

* * * * *

UNITED STATES PATENT AND TRADEMARK OFFICE
CERTIFICATE OF CORRECTION

PATENT NO. : 7,642,097 B2
APPLICATION NO. : 12/163751
DATED : January 5, 2010
INVENTOR(S) : Mel N. Kronick et al.

It is certified that error appears in the above-identified patent and that said Letters Patent is hereby corrected as shown below:

In column 22, line 3, in Claim 8, delete "microscopic" and insert -- microscope --, therefor.

Signed and Sealed this

Twenty-fifth Day of May, 2010

David J. Kappos
*Director of the United States Patent and Trademark Office*